United States Patent
Cottrell

(10) Patent No.: US 6,848,871 B1
(45) Date of Patent: Feb. 1, 2005

(54) STRAP TIE-DOWN SYSTEM

(75) Inventor: D. Michael Cottrell, Gainesville, GA (US)

(73) Assignee: Cottrell, Inc., Gainesville, GA (US)

( * ) Notice: Subject to any disclaimer, the term of this patent is extended or adjusted under 35 U.S.C. 154(b) by 0 days.

(21) Appl. No.: 10/322,964

(22) Filed: Dec. 19, 2002

(51) Int. Cl.$^7$ .............................................. B60P 3/079
(52) U.S. Cl. ............................. 410/7; 410/12; 410/23
(58) Field of Search ........................ 410/7, 9, 10, 11, 410/12, 19, 21, 22, 23, 97, 100

(56) References Cited

U.S. PATENT DOCUMENTS

| | | | |
|---|---|---|---|
| 2,205,273 A | * | 6/1940 | Radey .......................... 410/10 |
| 2,571,213 A | * | 10/1951 | Cunningham et al. ....... 414/536 |
| 2,609,761 A | * | 9/1952 | Clark |
| 2,873,693 A | * | 2/1959 | Chapman et al. |
| 2,874,992 A | * | 2/1959 | Erickson |
| 3,038,740 A | | 6/1962 | Blunden |
| 3,473,487 A | * | 10/1969 | Blunden ....................... 410/12 |
| 3,589,304 A | * | 6/1971 | Haynes ........................ 105/269 |
| 3,650,222 A | * | 3/1972 | Brolling ....................... 410/12 |
| 3,658,012 A | * | 4/1972 | Caringi |
| 3,685,856 A | | 8/1972 | Blunden |
| 3,820,817 A | * | 6/1974 | Harold ......................... 410/23 |
| 3,827,662 A | * | 8/1974 | Krokos |
| 3,841,235 A | | 10/1974 | Wheeler et al. |
| 3,853,347 A | * | 12/1974 | Harold ......................... 410/11 |
| 3,860,263 A | * | 1/1975 | Taylor .......................... 410/12 |
| 3,877,671 A | * | 4/1975 | Underwood et al. ......... 248/346 |
| 4,044,691 A | * | 8/1977 | Kilgus et al. ................. 410/12 |
| 4,068,813 A | | 1/1978 | Chatwin et al. |
| 4,081,196 A | | 3/1978 | Dandridge, Jr. |
| 4,130,067 A | * | 12/1978 | Kilgus et al. ................. 410/12 |
| 4,131,264 A | | 12/1978 | Patterson, III |
| 4,223,869 A | | 9/1980 | Patterson, III |
| 4,273,486 A | * | 6/1981 | Tatina ......................... 410/103 |
| 4,293,255 A | * | 10/1981 | Hrasche ...................... 410/104 |
| 4,382,736 A | * | 5/1983 | Thomas ...................... 410/104 |
| 4,390,141 A | * | 6/1983 | Webster ................... 242/404.2 |
| 4,960,353 A | * | 10/1990 | Thorndyke ................... 410/10 |
| 4,993,898 A | * | 2/1991 | Klahold ........................ 410/12 |
| 5,180,262 A | | 1/1993 | Westerdale |
| 5,746,554 A | | 5/1998 | Boydstun, IV |
| 5,755,540 A | | 5/1998 | Bushnell |
| 6,171,036 B1 | | 1/2001 | Boydstun, IV |
| 6,572,312 B2 | * | 6/2003 | Cottrell ........................ 410/11 |

* cited by examiner

Primary Examiner—D. Glenn Dayoan
Assistant Examiner—H. Gutman
(74) Attorney, Agent, or Firm—Hinkle & O'Bradovich, LLC

(57) ABSTRACT

A strap tie down apparatus and system for vehicle transporters is provided. With conventional idlers removed from the individual platforms on the transporter, elongated bars on the platforms are provided with a series of slots. Removable idlers adapted to be connected and disconnected from the slots as needed are provided. Strap spools are connected at the ends of the platforms, the spools being adapted to roll up straps that are threaded and routed through the idlers, then connected to the underbody of the vehicles being transported. The strap spools are coupled to conventional ratchet devices to tighten the straps to secure the vehicles.

5 Claims, 4 Drawing Sheets

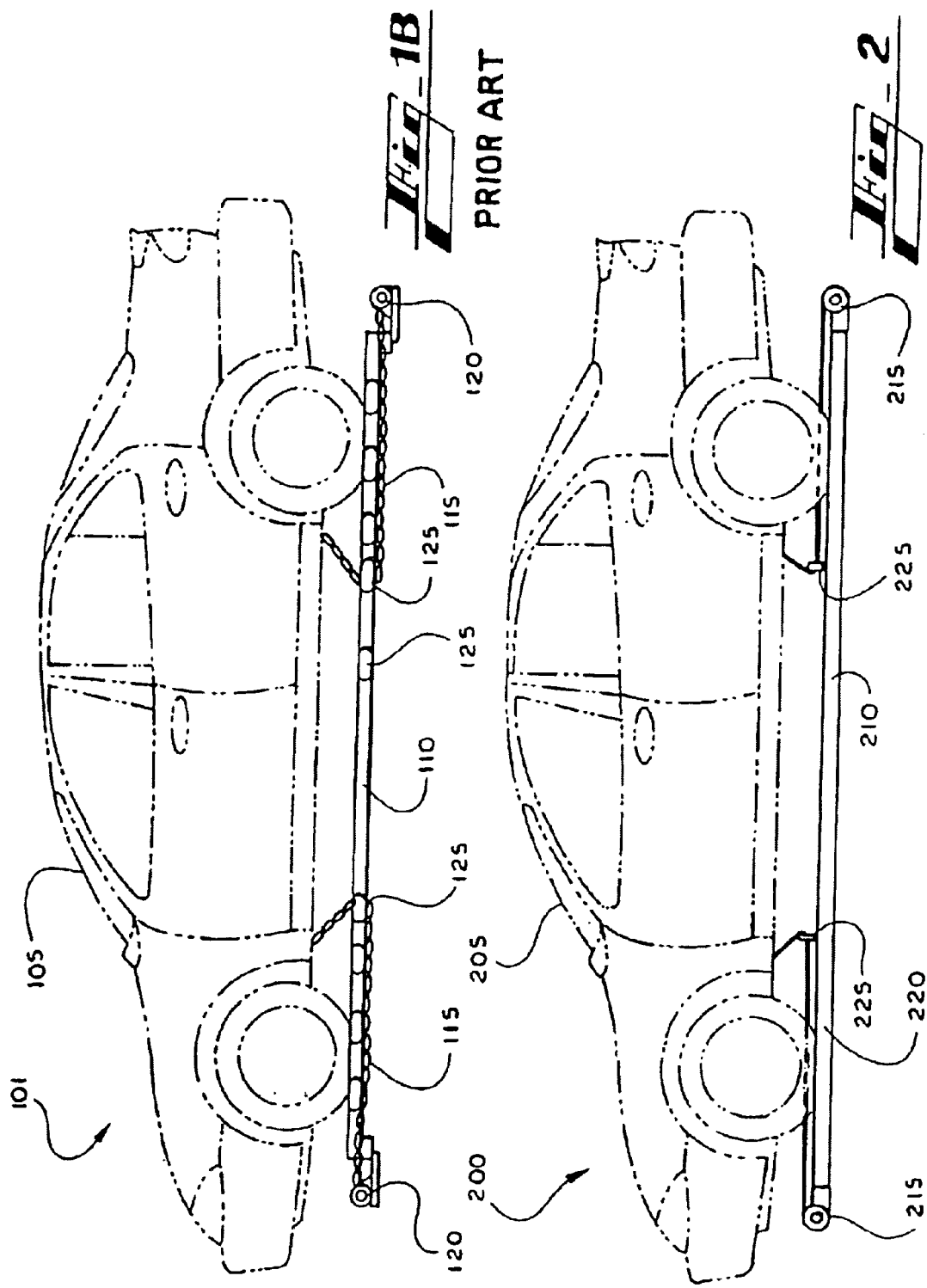

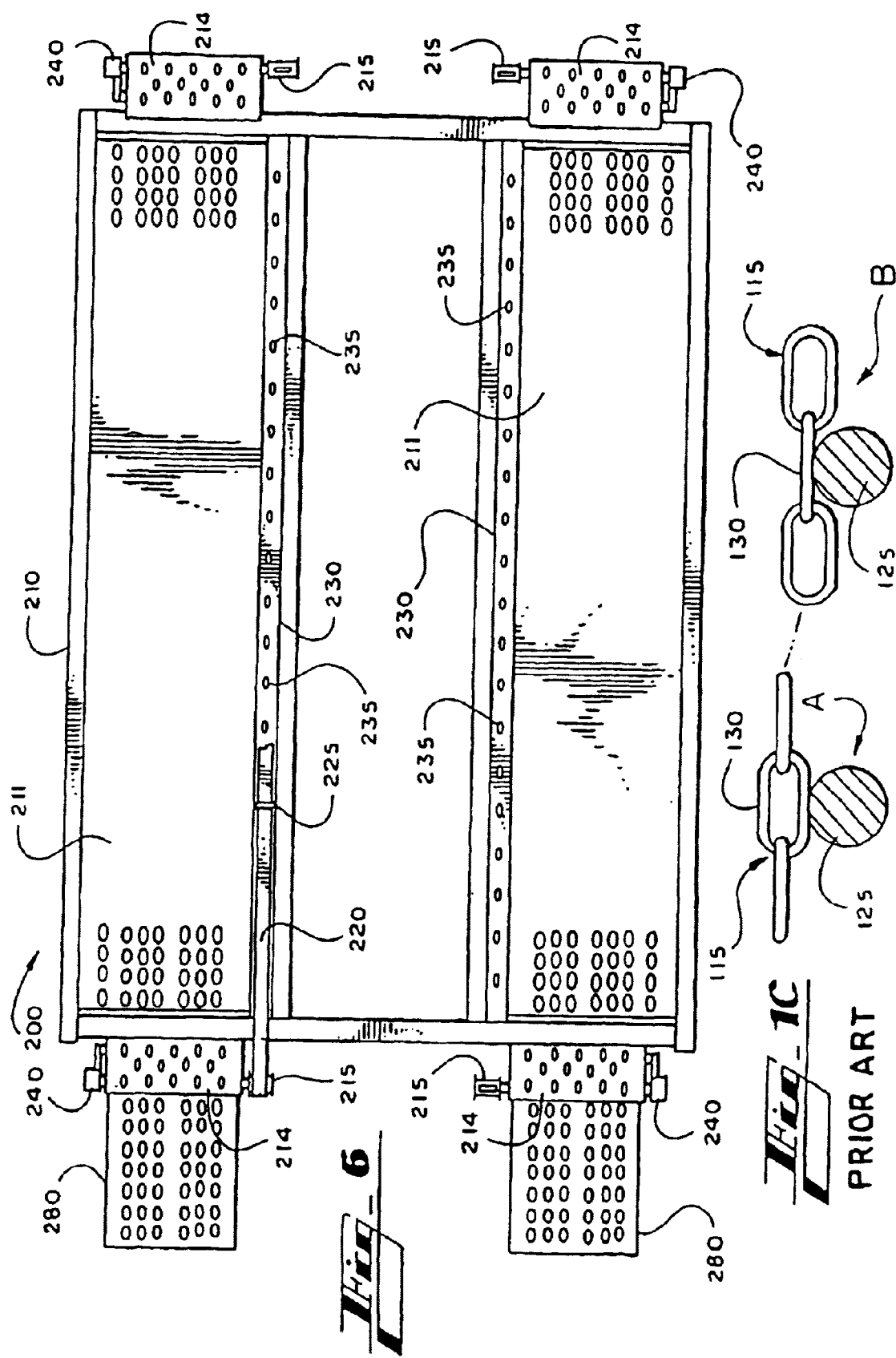

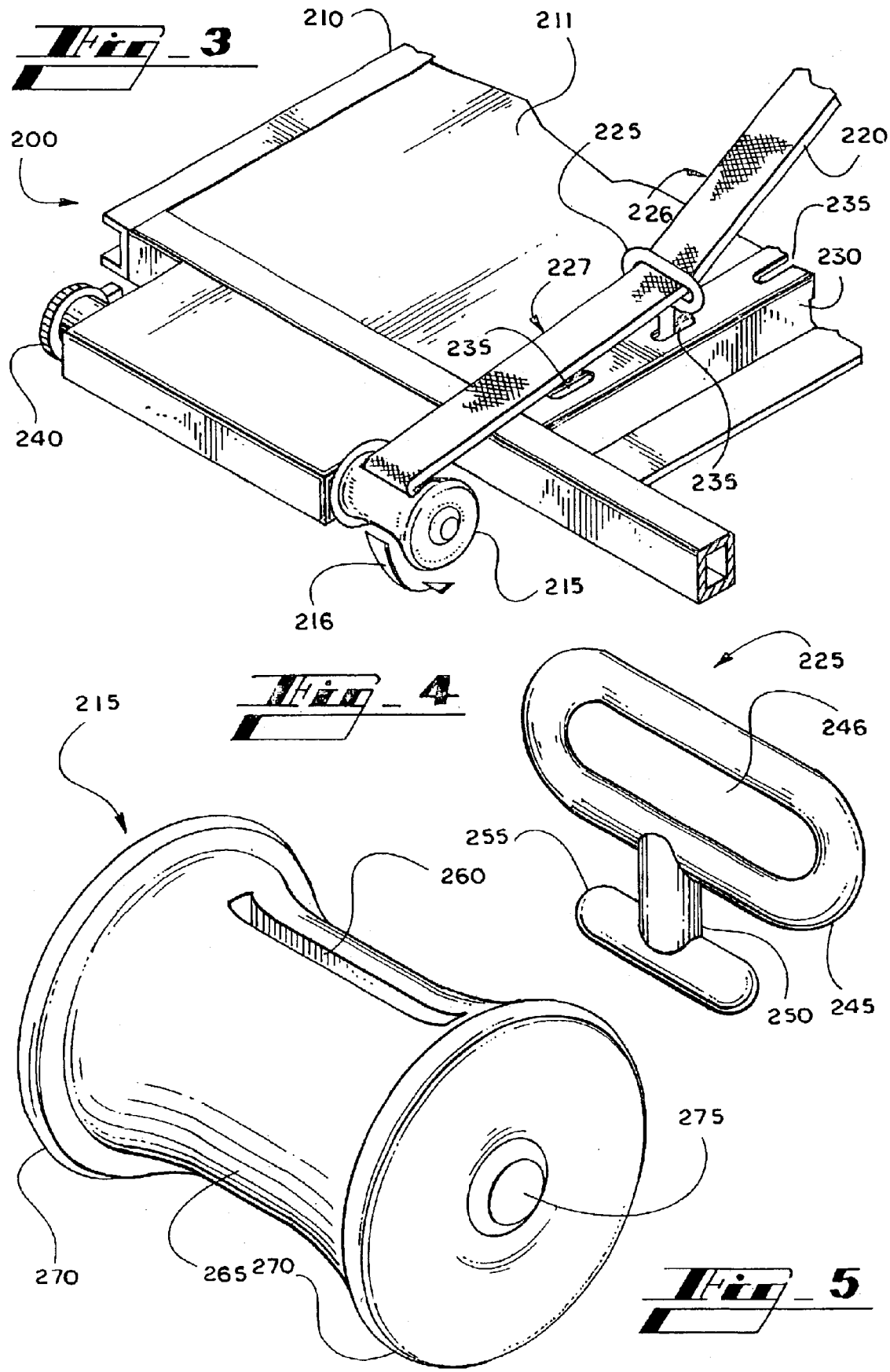

STRAP TIE-DOWN SYSTEM

BACKGROUND OF THE INVENTION

I. Field of the Invention

The present invention relates generally to the field of vehicle transporters and more particularly to a strap tie-down apparatus and system.

II. Description of the Related Art

FIG. 1A illustrates a prior art vehicle transport trailer 100. Several vehicles 100 can be transported on the trailer. Each of the vehicles typically has its own platform 110 onto which each vehicle 105 is secured.

FIG. 1B illustrates a side view of a prior art vehicle trailer tie down system 101. As previously described, each vehicle 105 is secured to its platform 110. FIG. 1B illustrates the vehicle 105 tied to its platform 110 by chains 115 in a "V" arrangement. Those skilled in the art understand that the chains 115 can be tied in other arrangements such as an "A" arrangement. Other tying devices can be used such as ropes, straps and the like. The vehicle 105 is typically restrained to the platform 110, and therefore the trailer, by connecting the chains 115 to the frame of the vehicle 105 and the platform 110 or other part of the trailer. The chains 115 are placed in tension to prevent movement. The chains 115 are tightened in opposite directions to prevent the vehicle 105 from shifting front to back or vice versa. Currently, locking mechanisms 120 are used to keep the chain 115 from loosening due to forces acting upon the vehicle 105 (e.g. gravity, centripetal and other forces asserted on the vehicle 105 from the trailer or otherwise). There are many types of mechanisms 120 such as ratchet and clamping devices that are typically manually tightened by the driver of the trailer. The chain 115 also has to be routed around the idlers 125 or the tightening mechanism 120 has to be relocated in order to achieve sufficient tension in the chain 115 in the correct direction to properly secure the vehicle 105. FIG. 1C illustrates two side views A, B of a chain 115 in contact with a portion of an idler 125. In view A, the chain link 130 is shown positioned in a standing position on the idler.

If nylon straps, which are sometimes used to wrap around vehicle 105 tines for transport, are used as a direct replacement of chains, welds on the idlers 125 as well as the ratchet system 120 can wear the straps and cause fraying and tearing of the straps thereby shortening the useful lifetime of the straps.

SUMMARY OF THE INVENTION

In general the invention features a strap tie-down system that replaces conventional fixed idlers with removable portable idlers that reduce wear and fray on the straps. The invention further includes a strap spool on the conventional ratchet systems that also reduces wear and fray on nylon straps.

In general, in one aspect, the invention features a strap tie down apparatus, including an elongated bar or section having a hollow interior and adapted to be affixed to a vehicle transporter platform, a series of slots along the elongated bar, at least one removable idler having a section adapted to be connected to the slots and a section adapted to receive a strap and at least one strap spool located at the end of the elongated bar, the strap spool being adapted to receive and secure an end of the strap. It is understood that the elongated bar or section can include other mechanisms to connect the portable idler. For example, instead of slots, links, hoops, hooks, eyes or any other suitable mechanism can be attached to the bar or section to connect to the portable idles.

In one implementation, the section of the idler adapted to receive a strap is an oval having an elongated center opening.

In another implementation, the section of the idler adapted to be connected to the slots is a first short rod connected to the oval by a second short rod connected substantially perpendicular to the first short rod and to the oval.

In another implementation, the strap further includes a device adapted to connect to the underbody of a vehicle, the device connected to one end of the strap.

In another implementation, the strap spool includes a body having a notch adapted to receive an end of the strap, and a concave surface.

In another aspect, the invention features a strap tie down system, including a platform having a frame and one or more planar surfaces adapted to receive a vehicle, wherein the platform includes at least one elongated bar within the platform, the bar having a series of slots, at least one removable idler adapted to be inserted into the slots, at least one strap spool connected at one end of the platform and at least one strap connected to the strap spool and threaded through the idler.

In one implementation, the system further includes at least one ratchet device connected to one end of the platform and coupled to the strap spool with a ratchet shaft.

In another implementation, the strap spool is adapted to receive and wrap up the strap so that the strap is retained on the strap spool.

In still another aspect, the invention features a vehicle transporter, including a plurality of platforms adapted to receive a vehicle, each of the platforms two substantially parallel elongated bars, each of the bars having a series of slots, a plurality of idlers adapted to be placed into the slots in a desired location to receive straps to be connected to the underbody of the vehicle, a plurality of strap spools connected to various locations of the platform, the strap spools being connected to the straps and a plurality of devices coupled to the respective strap spools, the devices being adapted to rotate the strap spools to tighten the respective straps threaded through the respective idlers to secure the vehicles to the respective platforms.

In one implementation, the platforms further comprise flippers to allow the vehicles to be loaded and off loaded from the platforms, and to temporarily extend the length of the platform, as required, to receive the vehicle. The flipper can also have mechanisms such as slots, hooks, and the like, to receive the idler.

In yet another aspect, the invention features a strap spool apparatus, including a body having a curved (concave), saddle like surface adapted to roll up a strap used to secure a vehicle to a vehicle transport platform, wherein the body includes a notch adapted to receive an end of the strap that allows the strap to wrap around itself on the body.

In one implementation, the apparatus includes raised sides adjacent to the curved surface adapted to retain the strap on the curved surface.

In another implementation, the apparatus includes a channel through the body, the channel adapted to couple to a ratchet device to rotate the body so that the strap rolls onto the body.

In another aspect, the invention features an idler apparatus, including a first section adapted to receive a strap used to secure a vehicle to a vehicle transport platform and a second section connected to the first section, the second section being adapted to connect to a notch on the vehicle transport.

One advantage of the invention is that straps can be used and tightened with decreased concern that the straps will tear and fray from use from the reduction of weld points.

Another advantage of the invention is that the useful lifetime of the nylon straps used for tie down systems is increased.

Another advantage of the invention is that more precise tie down angles can be achieved due to increased and more flexible idler locations.

Another advantage is that the removal of fixed idlers generally decreases the overall weight of the transporter.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 1B illustrates a side view of a prior art car trailer tie down system;

FIG. 1C illustrates two side views of a chain in contact with a portion of an idler;

FIG. 2 illustrates a side view of an embodiment of a strap tie down system;

FIG. 3 illustrates a perspective view of a portion of an embodiment of a strap tie down system;

FIG. 4 illustrates a view of an embodiment of a removable idler of an embodiment of a strap tie down system;

FIG. 5 illustrates a view of an embodiment of a strap spool of an embodiment of a strap tie down system; and FIG. 6 illustrates a top view of an embodiment of a strap tie down system.

DETAILED DESCRIPTION OF THE INVENTION

Figure 1A:
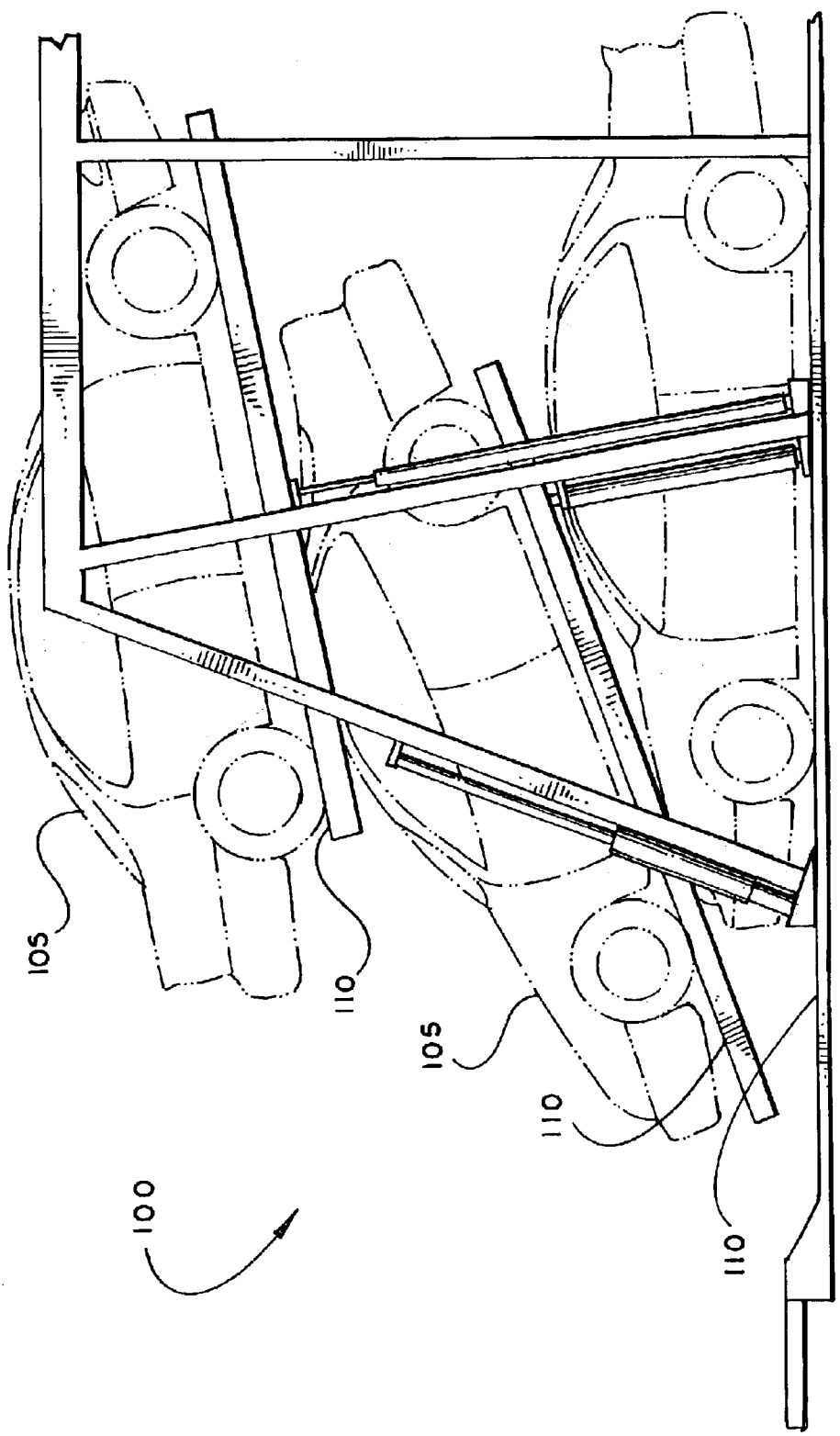
FIG. 1A illustrates a prior art car trailer.

Referring to the drawings wherein like reference numerals designate corresponding parts throughout the several figures, reference is made first to FIG. 2 that illustrates a side view of an embodiment of a strap tie down system 200. The system 200 generally includes a platform similar to prior art systems onto which a vehicle 205 can be loaded. The vehicle 205 is secured to the platform 210 with straps 220. The straps 220 are made from conventionally available materials used in conventional straps such as but not limited to nylon. The straps 220 connect to the underbody of the vehicle 205 by conventionally available hooks and the like. FIG. 2 illustrates two straps 220. As is described further below, four straps 220 are typically used to secure the vehicle 205 to the platform 210.

The system 200 further contains a strap spool 215 connected at the ends of the platform 210. Typically there is one strap spool 215 per strap 220. The strap spool 215 is typically coupled to a conventional ratchet device (shown below) to tighten the strap 220 on the strap spool 215.

The system 200 further includes removable idlers 225, which is described further below. It is understood that the idlers 225 described herein are different from conventional idlers as described in the prior art. The idlers 225 are adapted to be affixed and removed at needed and desired locations along the platform 210 as is described in further detail below.

The vehicle 205 is shown secured to the platform 210 in a "V" arrangement. It is understood that the vehicle 205 can be secured to the platform 210 in other arrangements such as an "A" arrangement. Typically the straps 220 are secured to the underbody of the vehicle 205 and routed through the idlers 225. The straps 220 are then secured to the strap spools 215 and tightened as needed. If the idlers 225 need to be relocated they can be removed from the platform 210 as needed and moved to the necessary position along the platform 210. Typically the idlers are removed and repositioned when the straps 220 are not tightened.

FIG. 3 illustrates a perspective view of a portion of an embodiment of a strap tie down system 200. In this view, one isolated strap spool 215, strap 220 and idler 225 are shown to described the system 200 in greater detail. The platform 210 further includes a planar surface 211 onto which a vehicle can be loaded. Typically, the planar surface 211 comes into contact with the vehicle's wheels (not shown). The platform 210 further includes one or more elongated substantially hollow support bars 230 that runs most of the length of the platform 210. The bars 230 include a series of slots that expose the hollow interior of the bars 230. The removable idlers 225 can be inserted into the slots 235 and secured within the slots. The idlers 225 can be removed from the slots 235 by rotating the idlers 225 approximately 90 degrees in either of the directions of the arrows 226, 227 and pulled upward from the slots 235. The idlers 225 can be removed and replaced as needed with or without the strap 220 threaded through the idlers 22S. Typically if the strap 220 is threaded through the idler 225, the strap spool 225 needs to be loosened in order to release tension in the strap 220 so that the idler 225 can be removed and replaced with greater ease. In a typical implementation, he strap spool is tightened in the direction of the arrow 216. It is understood that the slots 235 are used to receive the idler 225. Therefore, other mechanisms can be used instead of the slots 235 such as hooks, links, hoops, eyes and the like.

As described above, the strap spool 215 is coupled to a conventional ratchet 240, typically with a ratchet shaft, so that the strap spool 215 can be tightened and loosened as needed. It is understood that other devices other than the conventional ratchet 240 can be implemented in the system 200 to loosen and tighten the strap spool 215 as needed. For example, motors and gears can be used. Furthermore, the force applied to tighten the strap spool 215 can be linear or rotational.

FIG. 4 illustrates a view of an embodiment of a removable idler 225 of an embodiment of a strap tie down system 200 as described above. FIG. 3 illustrates the idler 225 as it appears when it is removed from the system 200. Generally, it is contemplated that a removable idler includes a section that attaches to the platform and a section through which a strap is threaded. In a typical embodiment, the idler 225 includes an oval portion 245 including an elongated center hole 246 through which a strap (see above) is threaded. The oval section typically has a circular cross section in order to provide the smoothest edges as possible. All of the edges of the oval portion are smoothed as much as possible so that there are no sharp edges that can catch and therefore fray and damage the strap that is threaded though the oval. The idler 225 also typically includes a short rod section 250 attached generally perpendicular to one side of the oval section 245. Another short rod section 255 is then typically attached generally perpendicular to the short rod section 250. Referring again to FIG. 3, it is understood that the idler 225 can be attached to the platform 210 by orienting the short rod section 255 generally parallel and adjacent the desired slot 235, inserted into the slot 235, then twisted approximately 90 degrees so then the short rod section 255 is in the interior of the bar 230 and generally oriented perpendicular to the slot so that it is secured within the bar 230. When the strap 220 is tightened on the strap spool 215, the idler 225 is then further secured within the bar 230, with the short rod section 250 protruding from the slot 235. In a typical embodiment, the idler 225 is made from steel or other sturdy metal. The individual sections 245, 250, 255 can be welded, soldered or other wise connected, or the sections 245, 250, 255 can be a single integral piece. If welded or otherwise connected, rough and sharp edges are typically smoothed so as not to damage the strap threaded though the idler 225. It is understood, that the idler 225 can be modified in a variety of ways without departing from the spirit of the idea of a removable idler. For example, the oval section can be changed in shape or form and serve the same function to thread the strap. In another example, an additional section can be added to either the oval section or the short rod section 255 lengthening the idler 225. Other embodiments are contemplated that allow the strap to be threaded to the removable idler 225. For example, the oval portion 245 can have any suitable shape to accommodate the strap 220 such as a square, triangle, and the like. Furthermore, the short rod section 255 can be a hook or other suitable mechanism to connect to the transporter.

FIG. 5 illustrates a view of an embodiment of a strap spool 215 of an embodiment of a strap tie down system 200. It is contemplated that the strap spool 215 generally includes a section with a smooth concave type surface that allows the strap to be rolled up onto to it. The smooth surface is generally free from sharp and rough edges so that the strap is not damaged and so that the strap does not bunch or roll off the spool. In a typical embodiment, the strap spool includes a main body section 265 having a smooth surface. The surface of the body 265 is generally concave or saddle-like. The concave or saddle-like surface allows the strap to be rolled on the spool 215 so that the strap does not bunch up or buckle. As the strap is tightened onto the spool it generally takes on the similar shape of the surface of the body 265. The sides 270 of the spool 215 can be slightly raised higher than the surface of the body 265 so that the strap does not run off the sides of the spool 215. The spool 215 further typically includes a notch 260 into which the and of the strap is threaded. The notch can run partially through or all the way through the body 265. When the strap is threaded through the notch 260 and the spool subsequently tightened, as the strap rolls onto itself the friction of the strap secures the strap onto the body 265 so that the strap does not slide off the spool 215. The spool further includes a channel 275 through which a rod or other suitable device can affix and couple to a ratchet as described above.

FIG. 6 illustrates a top view of an embodiment of a strap tie down system 200. The system 200 is shown with only one strap 220 connected to one strap spool 215 and one idler 225 for illustrative purposes. The remaining strap spools 225 are without straps. Each of the strap spool 215 is coupled to a ratchet device 240, via a ratchet shaft, not shown. The platform 210 includes planar surfaces 211 onto which vehicles can be loaded. The platform is shown with two elongated bars 230 having a series of slots 235 into which the removable idlers 225 can be placed and removed as needed. The platform further includes flippers 280 that can be used to load and off load vehicles.

Since the use of the straps 220, strap spools 215 and removable idlers 225 allow more precise tie down angles, other strap spools 215 and ratchets 240 can be added on the platform 210 at various locations. For example, an additional strap spool 215 can be added near the location of the tire of a vehicle for tire tie down onto the platform, allowing greater flexibility as to where the vehicle can be secured to the platform 210. In another example, an additional strap spool 215 can be added on the ratchet shaft (not shown) between the existing strap spool 215 and ratchet device 240. The protruding box 214 that contains the ratchet shaft can include an opening so that an additional strap can be attached to the additional strap spool. This arrangement allows the strap to be conveniently strapped around the tire of a vehicle.

The foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A strap tie down system, comprising:
    a platform having a frame and one or more planar surfaces adapted to receive a vehicle, wherein the platform includes at least one elongated bar within the platform, the bar having a series of slots;
    at least one removable idler adapted to be inserted into the slots, the idler having an oval body having an elongated center opening being adapted to receive the strap;
    at least one strap spool connected at one end of the platform, the strap having a body having a notch adapted to receive an end of the strap, and a concave saddle-like surface and raised sides adjacent to the concave surface adapted to retain the strap on the curved surface; and
    at least one strap connected to the strap spool and threaded through the idler.

2. The system of claim 1, wherein the idler further comprises a first rod connected to the oval by a second rod connected substantially perpendicular to the first rod and to the oval.

3. The system of claim 1, further comprising at least one ratchet device connected to one end of the platform and coupled to the strap spool with a ratchet shaft.

4. The system of claim 3, wherein the strap spool is adapted to receive and wrap up the strap so that the strap is retained on the strap spool.

5. A vehicle transporter, comprising:
    a plurality of platforms, each platform being adapted to receive a vehicle, and having a frame and one or more planar surfaces adapted to receive a vehicle, wherein the platform includes at least one elongated bar within the platform, the bar having a series of slots;
    at least one removable idler adapted to be inserted into the slots;
    at least one strap spool connected at one end of the platform, the strap spool having a body having a notch adapted to receive an end of the strap, and a concave saddle-like surface and raised sides adjacent to the concave surface adapted to retain the strap on the curved surface;
    at least one strap connected to the strap spool and threaded through the idler; and
    wherein the each of the platforms includes flippers to allow the vehicles to be loaded and off loaded from the platforms.

* * * * *